Oct. 10, 1967    C. E. PURDIE    3,345,903
LOADING PRESS
Filed June 15, 1965    3 Sheets-Sheet 1
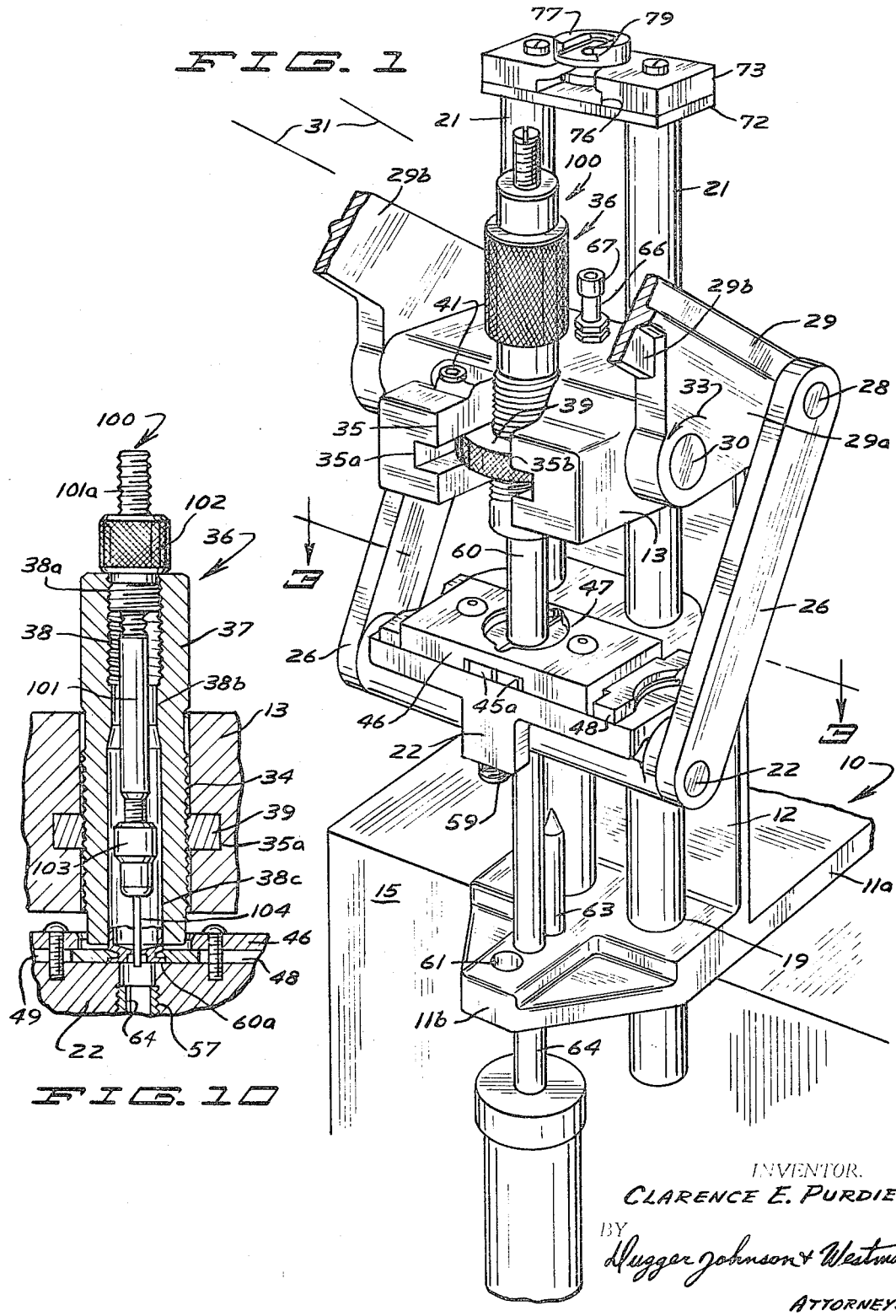
INVENTOR.
CLARENCE E. PURDIE
BY
Dugger Johnson & Westman
ATTORNEYS

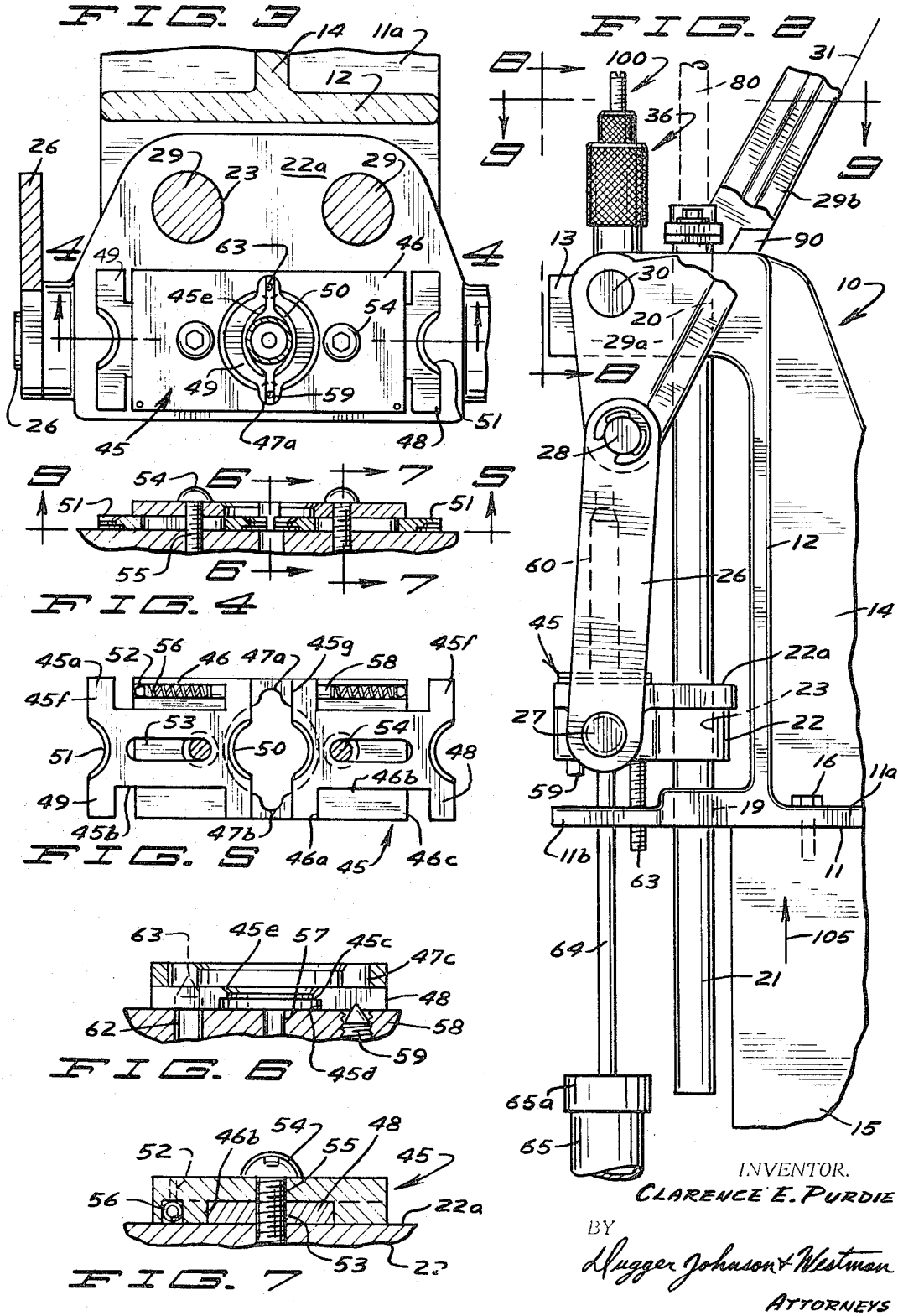

INVENTOR.
CLARENCE E. PURDIE
BY
Dugger Johnson & Westman
ATTORNEYS

United States Patent Office 3,345,903
Patented Oct. 10, 1967

3,345,903
LOADING PRESS
Clarence E. Purdie, Box 246, Faribault, Minn. 55021
Filed June 15, 1965, Ser. No. 464,100
18 Claims. (Cl. 86—23)

This invention relates to a new and novel loading press for selectively resizing the neck end of a cartridge case, removing primers, reseating a new bullet in the neck end of the cartridge case, and seating a new primer in the primer socket of a cartridge case. More particularly this invention relates to a loading press having a new and novel cartridge holding jig that is automatically opened to a cartridge release position at the end of the pressing operation; and usable in conjunction with a suitable die for removing a fixed primer and resizing the neck end of a cartridge case, and reseating a new bullet in the neck end of a cartridge case.

One of the problems of prior art apparatus usable in reloading cartridge cases has been their limitation in the facility with which it may be used for various size cartridge cases. Additionally, in prior art apparatus either the cartridge case is not firmly held in a fixed, centered position in a loading press jig and/or only with difficulty can the cartridge case be removed from the jig. Further, in order to remove the dies from prior art presses, the dies have to be unthreaded from the press. In order to overcome problems of the aforementioned nature and additional problems, this invention has been made.

One of the objects of this invention is to provide a new and novel loading press having a fixed frame and a guide rod supported cartridge carrier movable with a guide rod between a datum condition and a pressing condition. Another object of this invention is to provide a new and novel floating guide rod cartridge carrier in a loading press. Still another object of this invention is to provide a new and novel loading press having compound leverage for exerting the maximum amount of force adjacent the pressing position.

Still another object of this invention is to provide a new and novel cartridge loading press having a jig for automatically releasing a clamping engagement with a cartridge case as the cartridge carrier is moved toward and adjacent a datum position. An additional object of this invention is to provide a new and novel self-operating sliding jaw jig having diametrically self-centering jaws for releasably holding a cartridge case. Still another object of this invention is to provide an adjustment in cartridge case jig for selectively adjusting the minimum spacing between adjacent jaws of the jig. A further object of this invention is to provide new and novel holding jig that is moved toward a die having a cartridge case extended therein whereat the jig jaws will automatically close on the cartridge rim and withdraw the cartridge case from the die as the jig carrier is moved in an opposite direction. Still another object of this invention is to provide a cartridge jig having a pair of symmetrical jaws that at each of their one ends are of a shape and size for a thin rimmed cartridge case and at the opposite ends for a thick rimmed cartridge case.

Still an additional object of this invention is to provide a new and novel loading press having a primer loading device operated through the movement of floating guide rods for inserting a new primer into a cartridge socket. Still another object of this invention is to provide a snap-in die changing feature in a loading press.

Other and further objects are those inherent in the invention herein illustrated, described, and claimed and will become apparent as the description proceeds.

To the accomplishment of the foregoing and related ends, this invention then comprises the features herein after fully described and particularly pointed out in the claims, the following description setting forth in detail certain illustrative embodiments of the invention, these being indicative, however, of but a few of the various ways in which the invention may be employed.

The invention is illustrated in the drawings in which corresponding numerals refer to the same parts and in which:

FIGURE 1 is a perspective view of the loading press of this invention with a major portion of the operating handle being broken away, said view showing the cartridge carrier approximately midway between the datum position and the maximum pressing position, and also showing a die mounted on the loading press head;

FIGURE 2 is a side elevational view of the structure of FIGURE 1 with the cartridge carrier at its datum condition;

FIGURE 3 is a horizontal cross sectional view generally taken along the line and in the direction of the arrows 3—3 of FIGURE 1 to more clearly illustrate the cartridge carrier and the cartridge jig mounted thereon;

FIGURE 4 is a transverse, vertical cross sectional view generally taken along the line and in the direction of the arrows 4—4 of FIGURE 3 (other than no cartridge case is shown) to illustrate the cartridge jig of this invention and the mounting thereof on the cartridge carrier;

FIGURE 5 is the bottom view of the jig of FIGURE 4 except for the jig jaws being shown in a maximum spread condition;

FIGURE 6 is a vertical cross sectional view generally taken along the line and in the direction of the arrow 6—6 of FIGURE 4;

FIGURE 7 is a vertical longitudinal cross sectional view generally taken along the line and in the direction of the arrow 7—7 of FIGURE 4;

Figure 8:
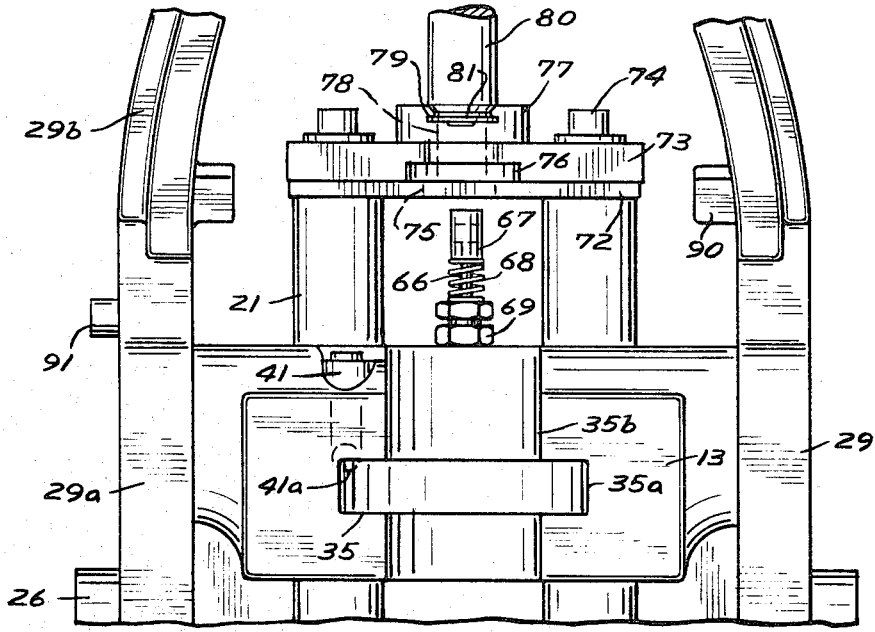
FIGURE 8 is a fragmentary front view of the structure at the upper end of FIGURE 2 except that the handle has been moved to position that the primer loader is more closely adjacent the upper ends of slide rods than that illustrated in FIGURE 1, said view otherwise being generally taken along the line and in the direction of the arrows 8—8 of FIGURE 2.
Figure 9:
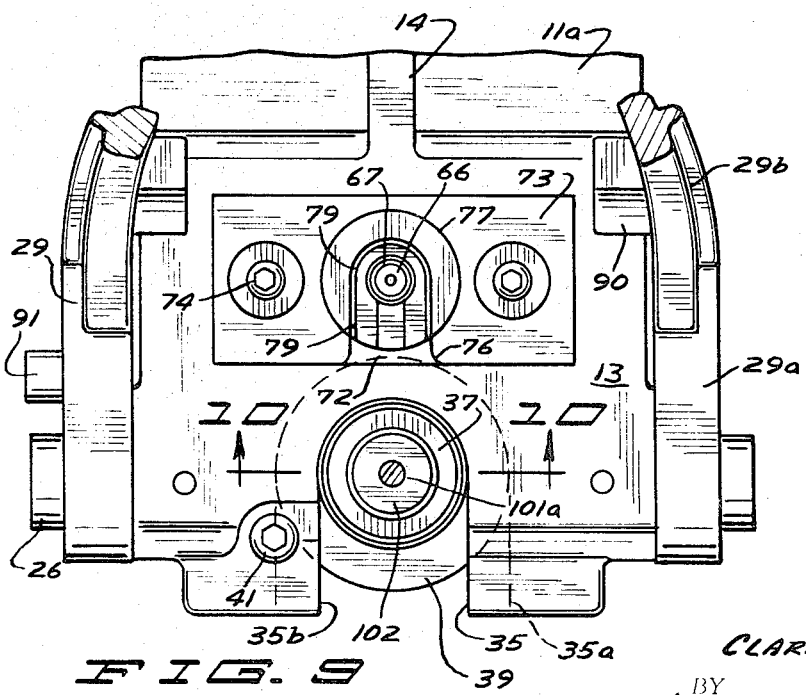

FIGURE 9 is a plan view of the structure shown in FIGURE 8, said view being generally taken along the line and in the direction of the arrows 8—8 of FIGURE 2; and FIGURE 10 is a fragmentary, transverse cross sectional view generally taken along the line and in the direction of the arrows 10—10 of FIGURE 9 to more clearly show the mounting of a die on the loading press, said view showing the lower end of a cartridge case.

Referring now in particular to FIGURES 1 and 2, the loading press of this invention includes a generally C-type frame, generally designated 10, that has generally horizontally extending base 11, an upright web 12 having a lower end integrally joined to the longitudinal mid-portion of base 11, a generally horizontally extending head 13 extending forwardly of the web 12 and having a rearward end integrally joined thereto, and a reinforcing flange 15 integrally joined to the rearward surface of web 12 and to the rearward portion 11a of the base 11. Base portion 11a is mounted on suitable support member 15 by being bolted at 16 or otherwise suitably secured thereto.

As may be noted from FIGURES 1 and 2, base 11 also has a base portion 11b extending forwardly of the web 12 which is in underlying relationship to the head 13 at a substantially lower elevation than the head. Base portion 11b has a pair of transversely spaced apertures 19 vertically extended therethrough, each aperture 19 being in vertical alignment with a corresponding aperture 20 that extends vertically through the head 13. As may be noted from FIGURE 2, the apertures 19 and 20 respectively are located a short distance forwardly of web 12, each set of apertures 19 and 20 being provided for slidably receiving a vertically elongated guide rod 21. Each guide rod has a vertically intermediate portion extended through the corresponding aperture 23 provided in the cartridge carrier 22, the cartridge carrier being mounted on the guide rods for movement with said guide rods.

As may be noted from FIGURE 2, the guide rods mount the cartridge carrier vertically intermediate base portion 11b and head 13 with the rearward edge of the carrier being horizontally spaced a short distance forwardly of web 12 and the major portion of the carrier located horizontally forwardly of the guide rods. Carrier 22 has a generally planar top surface 22a.

In order to move the carrier 22 from a datum position that it is adjacent but vertically above the raised part of base portion 11b as shown in FIGURE 2, to a position closely adjacent the head 13, there is provided a link 26 on each transverse side of the carrier. One end of each link is pivotally connected to the respective side of the carrier by a pivot member 27. The opposite ends of the links are pivotally connected at 28 to the adjacent one end of the respective bifurcated legs 29 of a generally Y-shaped handle. As may be readily noted from FIGURES 1 and 8, each bifurcated leg 29 extends along one transverse side of the head 13, and then curves inward to be joined to one another and to one end of an elongated handle rod (not shown). In a side vertical elevation each leg has a generally triangular part 29a. Pivotal connection 28 is made adjacent one apex portion of triangular part 29a while a second apex portion of part 29a is pivotally connected to the respective transverse side of the head by a pivot member 30. The third apex portion of each leg has one end of the elongated leg portion 29b connected thereto which extends generally outwardly along the plane of lines 31 to be joined to the other leg, and after the juncture, the handle rod (not shown) extends further outwardly along said plane. The handle is pivotable in the direction of the arrow 33 from the position of FIGURE 2 wherein the plane 31 thereof is at an angle of about 65° to the horizontal to a position about 235° to the horizontal. Pivot members 28 are swung through a corresponding angular amount whereby through links 26, the carrier 22 is moved from a datum position of FIGURE 2 to a pressing position that the carrier is adjacent the head 13. In this connection, it is to be noted that the guide rods 29 are of sufficient vertical length to slidably extend in both the respective apertures 19, 20 and still be located in both sets of apertures 19, 20 as the carrier is moved between the aforementioned positions.

The head 13 is provided with a slot 35 that is generally U-shaped in a horizontal plane, that extends vertically through the head, and that opens through the forward edge of the head. The slot has a lip 35b at the top and the bottom and a portion of an enlarged horizontal cross section to provide an enlarged U-shaped channel 35a which is vertically intermediate the top and bottom surfaces of the head. The vertical wall portions define the slot 35, including portions 35b and enlarged portion 35a, are smooth.

Slot 35 is provided for mounting a suitable die, generally designated 36, that has an axially elongated main body 37 with a central bore 38 extended vertically therethrough. A vertically intermediate portion of the main body is provided with threads 34 that provide a matching fit with the internal threads of the annular knurled mounting member 39. The maximum diameter of mounting member 39 is slightly less than a transverse spacing of transverse opposite vertical wall portions forming the legs of slot portion 35a and is of a heighth to form a relatively close sliding fit within the horizontal walls defining the slot portion 35a. Further, the maximum diameter of threads 34 is less than the transverse spacing the vertical leg surfaces of slot portion 35b, the web portion of slot portion 35a being of substantially the same radius of curvature as the radius of mounting member 39 and the web portion of slots 35b of substantially the same radius as the maximum radius of threads 34. As a result the die 36 may be slidably positioned in slot 35 with the wall portion defining said slot holding the die against wobbling. In order to prevent the die being accidentally dislodged from the head slot, there is provided a spring urged detent 41 and a suitable aperture in the head such that the ball 41a of said detent resiliently extends into slot portion 35a to bear against a surface portion of mounting member 39 longitudinally forwardly of a transverse diameter of the mounting member when the mounting member bears against the web portion of slot 35a.

Mounted on the carrier 22 in abutting relationship with the top surface 22a is a jig, generally designated 45, of this invention. The jig includes a holder 46 that is generally rectangular in plan configuration, and has a central aperture 47 which is generally circular other than for the aperture offsets 47a, 47b diametrically opposite one another.

The holder is provided with a central, generally rectangular, longitudinal cutout 46a in its bottom surface portion and a generally rectangular, transverse cutout 46b on either side of the cutout 46a to open thereto and to the respective longitudinal edge of the holder to provide depending, rectangular corner lands 46c. Each cutout 46b slidably receives an intermediate portion of a clamp jaw 48, 49 respectively. Each jaw is made from a generally flat plate and has longitudinally opposed rectangular cutouts 45b to provide a longitudinally extending ear 45a at each corner of the jaw, the aforementioned cutouts being of a slightly greater longitudinal dimension than the corresponding dimension of the adjacent land of the holder. Further the transverse dimension of each cutout 45b is substantially greater than the corresponding dimension of holder cutouts 46b whereby each jaw provided in one of the cutouts 46b may be slid a substantial transverse distance from a first position wherein one pair of ears 45a bear against vertical wall portions of cutouts 46a and centrally located positions that the adjacent vertical jaw surfaces can abut against one another.

One transverse end portion of each jaw is provided with a longitudinally centered arcuately curved cutout 50 and the opposite transverse edge portion with an arcuately curved cutout 51, the radii of curvature of cutout 50 being substantially the same as the corresponding radii of curvature of cutout 51. With each of the jaws mounted on the holder in an operating condition, the jaws are positioned such that either cutouts 50 face one another in underlined relationship to aperture 47 or cutouts 51 face each other in the aforementioned manner (the jaws being of identical construction).

Assuming the jig is mounted in operative condition on the holder such that cutouts 50 face one another, the general configuration of the cutouts 50 will be further described. Each of the cutouts 50 has a vertical wall portion (lip) 45c of a minimum radius of curvature located vertically intermediate the top and bottom planar surfaces of the respective jaw; a bottom, enlarged radius of curvature recessed wall portion 45d of a height greater than the rim flange 60a of the cartridge case to be held and of a larger radius of curvature than said rim flange, and a beveled wall portion 45e having a maximum radius of curvature at the top surface of the jaw and a minimum radius of curvature adjacent wall portion 45c. Likewise, each of the cutouts 51 is of a corresponding shape other than that the height of wall portion 45d is less than the corresponding wall portion of cutout 50 and the height of wall portion 45e is substantially greater than the corresponding wall portion of cutout 50. Thus cutouts 50 are faced toward one another when a large rim cartridge case is being worked on and cutouts 51 faced toward one another when a small rim cartridge case is being worked on.

Each of the jaws is provided with a centrally located, transversely elongated slot 53 intermediate cutouts 50, 51 to have a screw 54 extended therethrough. In order to mount the jig on the carrier, the screws 54 are extended through a respective aperture 55 which are located on transverse opposite sides of aperture 47, and through the respective slot 53 of the jaws, and thence threaded into the carrier such that the head ends of the screw abuts against the top surface of the holder 46 to retain the bottom surfaces of the lands 46c in abutting relationship with the carrier's top surface. The maximum transverse movement of the jaws relative to the holder is limited by the ears 45e. The vertical transverse edges of the lands 46c abutting against the corresponding cutout wall portions 45b prevent cocking of the jaws in a horizontal plane; and the bottom surface of the respective cutout 46b of the holder bearing against the adjacent top surface of the respective jaw prevent cocking of the respective jaw in a vertical direction.

To be noted is that the maximum transverse diameter of the aperture 47 is substantially greater than the maximum transverse spacing of the cutouts 50 (or cutouts 51 if the jaws are reversed end for end) when the jaws are in a maximum spread apart condition as shown in FIGURE 5. However, through the provision of an elongated transverse groove in each of a pair of transversely opposite lands 46c that opens to the slot 46a and the mounting of a coil spring 56 in each of the grooves to have one end bear against a stud 52 mounted by the holder and the opposite end bear against a plunger 58, the respective plunger abutting against the adjacent ear 45a resiliently urges the respective jaw toward a position that its generally longitudinal edge portions 45g abuts against the corresponding edge portion of the other jaw. Likewise, if the jaws are reversed end for end from the position shown in FIGURE 5, then through the provision of coil springs 55, the jaws are resiliently urged toward a position that longitudinal edge portions 45f would abut against one another.

The carrier is provided with a vertical primer discharge opening 57 that is horizontally centrally located with reference to aperture 47 and which threadingly receives the one threaded end of the primer discharge tube 64 (see FIGURE 10). The primer tube depends from the carrier and slidably extends through an appropriate aperture provided in base portion 11b and has its opposite end connected to the cover 65a of the container 65 such that both the tube and container will move vertically with the carrier. Tube 64 is of sufficient length that even with the carrier in a maximum elevated position, the cover 65a is still vertically beneath the base portion 11b. Container 65 is provided for receiving primers that fall through aperture 57.

The carrier is provided with a second vertical aperture 58 which in part is vertically beneath aperture portion 47a. A threaded stud 59 having an upper conical point is threaded into aperture 58 such that the conical portion extends to an elevation horizontally between vertical edge portions 45g (or 45f if the jaw is reversed) to retain the jaws at a minimum transverse spacing. That is, by, for example, threading stud 59 so that the conical point is at a higher elevation, the minimum spacing of the jaws is greater than if the stud 59 were turned in an opposite direction (within limits of the height of the conical portion). Through the provisions of the aperture portion 47a, stud 59 may be threaded to an elevation that the conical extends upwardly into said aperture portion.

Base portion 11b has a vertical aperture 61 directly below stud 59. Aperture 61 is of a larger diameter than stud 59 whereby stud 59 may extend into said aperture in the FIGURE 2 position if the stud were of a substantially longer length than illustrated in FIGURE 2.

On the diametric opposite side of aperture 57 from aperture 58 there is provided a vertical aperture 62 extended through the carrier and in part underlying aperture portion 47b. Aperture 62 is of sufficient diameter that the upper portion of threaded stud 63 may be slidably extended therethrough and have its upper conical point abut against the adjacent edges of the jaws to spread the jaws and thence extend upwardly into aperture portion 47b when the carrier 22 is moved adjacent base 11b (see position of stud 63 shown in dotted lines in FIGURE 6). The lower end portion of stud 63 is threadedly mounted in base portion 11b to extend thereabove. When the carrier is reciprocated downwardly from the position of FIGURE 1, the carrier is moved relative the stud 63 such that successively the conical point is at the elevation of the top surface of the carrier, next the conical portion spreads the jaws transversely as the carrier is moved further downwardly and subsequently in the lowermost carrier position of FIGURE 2, the pointed portion of stud 63 extends up into aperture portion 47b wherein the spacing between adjacent edge portions 45b is the same as the diameter of the stud 62 (in the last mentioned position being illustrated in dotted lines in FIGURE 6). At the time the carrier is in its lowermost position, stud 62 has spread the jaws such that the minimum diameter aperture portions 45c are spread a greater distance than the maximum diameter of the ring flange of the cartridge case that a work operation is to be performed on.

On the head 13 and transversely between guide rods 21, there is provided a primer holder having a cap head stud 66 with a lower end portion threaded into the head 13 and a sleeve 67 slideably mounted on stud 66 and slidable relative to the stud 66 a limited amount such that the sleeve may be moved relative the top surface of the stud between a position extending a substantial distance vertically thereabove as shown in FIGURE 8 to a position that the upper edge of the sleeve is at the same elevation of the top stud 66. That is sleeve 67 has a lower end portion of a reduced inside diameter that is less than the enlarged diameter upper end portion of the stud. There is provided lock nuts 69 on the stud to bear against the head 13 and a coil spring 68 having one end abutting against the upper lock nut and an opposite end abutting against the lower end of the sleeve 67 for resiliently retaining the sleeve in its uppermost position relative to the stud 66. The inside diameter of the upper end portion sleeve 67 is sufficient that it may have a primer inserted therein.

A horizontal mounting bar 72 has each transverse end portion abutting against the upper end of one of the guide rods 21 and a holder plate 73 in overlying relation relative thereto, there being provided cap bolts 74 extended through the apertures of the holder plate and mounting bar and threaded into respective guide rod for mounting member 72, 73 on the guide rods such as shown in FIGURE 8. Bar 72 has a vertical aperture 75 that is centrally located relative the vertical axis of sleeve 67 and of a substantially larger diameter than the outside diameter of said sleeve. Plate 73 has a recess that is generally U-shaped in a horizontal cross section and has an overhanging U-shaped lip for receivably holding a cartridge case holder 77. The cartridge holder has an intermediate annular groove such that the cartridge holder may be slipped into the recess 76 and held therein against vertical displacement through the overhanging lip extended into the annular groove while the bottom surface of the holder abuts against the top surface of the mounting bar 72. The cartridge holder has a vertical aperture 78 of a larger diameter than the outside diameter of the sleeve 67 whereby moving the carrier to its lowermost position, the primer holder will extend upwardly through aperture 75 and aperture 78. However, aperture 78 is of a smaller diameter than the diameter of the rim flange of the cartridge case 80 to be held by the cartridge holder 77.

The cartridge holder has a generally U-shaped slot 79 that has an overhanging lip to extend into the reduced diameter portion of the cartridge case between its rim 81 and the main body thereof. Slot 79 opens to apertures 78 and in a horizontal direction opens to the forward edge of the cartridge holder.

When a cartridge case 80 is positioned in the cartridge holder 77 such as illustrated in FIGURE 8 and a primer in the cup formed by sleeve 67 and stud 66, and thence the handle rotated in a direction opposite arrow 33, the guide rods and members 72 and 73 are moved downwardly whereby sleeve 67 relatively moves up through aperture 78 to abut against the bottom surfaces of rim 81. Further downward movement of cartridge holder 77 moves the bottom wall of the rim 81 against the sleeve to push the sleeve downwardly relative stud 66. Thereupon additional rotary movement of the handle results in the primer being seated in the primer socket of case 80.

In order to limit the downward movement of the carrier upon rotating the handle in the direction opposite arrow 33, there are provided a pair of ears 90 on the handle bifurcated legs to abut against the top surface of the head at the time the bottom surface of the carrier is slightly vertically spaced above the raised offset of base portion 11b (see FIGURE 2). At the time ears 90 abut against the head, pivot members 27 and 30 are located relative one another such that their central pivot axes lie in a common vertical plane. When the die 36 is properly mounted on the head, such as shown in FIGURE 1, the central vertical axis of said die 36 also lies in the last mentioned plane. Further the extension of the central vertical pivot axis of the die 36 forms an extension or continuation of the central vertical axis of aperture 57 in the carrier and aperture 47 of the cartridge holder. Due to the provision of the guide rods 29, the relative positions of pivot members 27 and 30, the jig holder aperture 47, and the die 36 are only vertically moveable relative one another as the handle is moved to move the carrier between its limit provisions. As will become more apparent hereinafter, this insures that the cartridge case on the holder is maintained in proper vertical alignment with the die 36.

When the carrier 22 is in its lowermost position the central transverse axis of pivot members 28 is only slightly to the right (as viewed in FIGURE 2) of a common vertical plane passed the axes of pivots 27, 30. Thus stops 90 prevent the links 26 being moved through an "over center" position relative pivots 27, 30.

Assuming that no die is mounted by the head, then the pivotal movement of the handle in the direction of the arrow 33 is limited by a transverse projection 91 which is joined to one triangular part 29a in a position to abut against an edge surface of link 26 at the time the top surface of the cartridge holder 45 is adjacent but spaced from the bottom surface of the head 13. In the last mentioned limit position, the transverse pivot axes of pivot members 27 and 30 are still in a common vertical plane, but pivot members 30 are located vertically between pivot members 27 and 28 with pivot member 28 horizontal slightly to the right of a common plane of axes of pivots 27, 30 as viewed from the side of FIGURE 2. Accordingly, there is provided a compound leverage action with maximum leverage being applied to upwardly move the carrier 22 when it is adjacent its uppermost position.

When the loading press is to be used for re-sizing cartridges and removing fired primers from cartridge 60, a primer remover and inside expander die, generally designated 100, is inserted into bore 38 of die 36 and has its upper threaded end 101 threaded into the upper threaded end portion 38a of said bore. Die 100 has a lock nut 102 threads on end portion 101a for holding it in an adjusted vertical position relative die 36. Die 100 also has a spindle 101 that has its upper end threaded into portion 101a and has an enlarged head 103 to perform the expanding operation that is threaded on the lower end of the spindle 101. The upper end of a decapping pin 104 is dependingly joined to the enlarged head 103.

Die 36 has an axial intermediate minimum diameter bore portion 38b that is a slightly larger diameter than the maximum diameter of the expander head 103 and a lower enlarged bore portion 38c of a diameter to perform a close fit with the exterior surface of the main body of the cartridge 60. Bore portion 38c has a smooth inner wall while the outer diameter of the lower end of the die main body 37 is less than the diameter of the outer aperture 47 whereby it is possible with the cartridge holder in its maximum upward position to have the lower end of die 36 extend into the cartridge holder aperture 47 to abut against the top surfaces of the jaws 48, 49.

When the loading press is to be used for seating a bullet in a cartridge case, die 100 is removed from die 36 and a suitable bullet seating die (not shown) is threaded into die 36. Thus, the combination of dies 100, 36 may be used for resizing the neck of a cartridge case, and removing a primer therefrom, and thereafter, upon removing die 100 and utilizing a bullet seating die in conjunction with die 36, the loading press may be utilized to seat a bullet in the neck portion of the cartridge case. Further, by utilizing the cartridge holder die 77 and primer loader 66–69, a new primer may be seated in a cartridge case.

The structure of this invention having been described, the operation will now be set forth. For the purposes of facilitating the description of the operation, it will be assumed that dies 36, 100 have been threadedly connected together and mounted on the head 13 with die 36 adjusted vertically by threading the main body 37 relative mount 39, that the carrier 22 is in its datum lowermost position relative the base, that jaws 48, 49 have been mounted on the carrier with recesses 50 facing one another, that adjustment stud 59 has been threaded upwardly a sufficient amount to set the minimum spacing between the jaws for the cartridge case to be worked on, and that the cartridge case is of a size to be held by recess portions 50 of said jaws. At this time, jaws 48, 49 have been transversely spread apart by stud 63 extending upwardly through the carrier, and between jaw edge portions 45g in abutting engagement therewith. This spacing of the jaws is sufficient that the cartridge 60 in an upright condition can be moved downwardly to have the bottom rim surface abut against the carrier top surface and the lips 45c of the jaws 48, 49 transversely spaced outwardly of the rim. Now upon pivoting handle in the direction of the arrow 33, links 26 elevate the carrier and thereby also move the guide rods 29 in the direction of the arrow 105 from the datum position of FIGURE 2, thence through position of FIGURE 1 wherein the neck portion of the cartridge has already entered the lower end of the bore and subsequently to the position of FIGURE 10 wherein the primer removing pin 104 has knocked the fired primer from the cartridge case and the primer has dropped down through tube 64 into container 65.

To be mentioned is that as the carrier is initally moved from its lowermost position (the FIGURE 2 position), the cartridge jig is elevated relative opening stud 63 and as a result of the constant resilient urging of springs 56, the jaw edges 45g are brought into and retained in sliding engagement with the tapered conical portion of stud 63, and accordingly the jaws are spring urged closer together as the jaws are moved vertically upwardly relative to said tapered portion. After the jaws have been vertically elevated a sufficient amount, the jaws have moved sufficiently close together that the lips 45c enter into the annular recess of the cartridge case just above the rim flange and overly the cartridge rim to hold the cartridge in place. At this time lips 45c extend over rim flange in abutting engagement with the cartridge case, and accordingly the cartridge case cannot be moved upwardly relative to the carrier. At this time vertical edges 45g are still transversely spaced from the conical point of stud 59.

In the event that the cartridge case in the carrier datum position had been inserted in a vertically off center condition relative to the jaws, due to the provision of a separate coil spring 66 for each jaw, the jaw most closely adjacent to the cartridge will exert a greater horizontal force on the cartridge case and due to the curvature of its lip 45c will thereby move the cartridge case to a vertically centered condition as the carrier is elevated.

In pivoting the handle so that the carrier is moved relative the frame between positions of FIGURE 1 and FIGURE 10, the neck of the cartridge is resized and the fired primer removed. Now, the handle is pivoted in the direction opposite arrow 33 whereupon the carriage is translated in the direction of the arrow opposite 105. Due to the provision of the lips 45c, this downward force is transmitted to the cartridge rim through the jaws, the jaw holder preventing vertical movement of the jaws relative to the carrier. As a result the cartridge case is moved vertically downwardly relative the dies 36, 100, and as the carrier approaches the FIGURE 2 position, the pointed portion of the opening stud 63 enters into aperture 62 subsequently into the space between adjacent jaw edge portions 45g to force the jaws apart as the carrier is further downwardly reciprocated. As previously indicated, the stud 63 is of sufficient diameter that it will spread the jaws sufficiently that the lips 45c will be located transverse outwardly of the rim flange 60a. Thus, in moving the carriage case and carrier downwardly to the carrier datum position, the stud 63 automatically spreads the jaws to automatically release the cartridge case.

After the cartridge has had the fired primer removed, and has been resized, it may be loaded with a new primer by, for example, inserting the rim end of the cartridge into the recess 79 of the cartridge holder 77 such as illustrated for cartridge case 80 in FIGURE 8. At this time a new primer is seated in the seat provided by the sleeve 67 and the stud 66. Now the handle is pivoted in the direction opposite arrows 33 whereupon the primer loader sleeve and stud are relatively moved upwardly through apertures 75, 78 until the sleeve abuts against the bottom surface of the cartridge 80. Further downward movement of holder 77 through continuing to pivot the handle in a direction opposite arrow 33 results in the new primer being seated in the primer socket (not shown) of cartridge 80. Now the handle is pivoted in a direction of arrow 33 and thence the cartridge with new primer removed from holder 77.

After cartridge case has been provided with a charge and a new primer, and after the die 100 has been removed from die 36 and has been replaced with a bullet seating die (not shown), the last mentioned cartridge may be positioned on the carrier in the manner described relative removing a primer. However, at this time, the upper movement of the carrier to cause the cartridge to enter die 36 will result in the bullet being seated in the neck portion of the cartridge.

Alternately the cartridge case to be provided with a new charge and primer may have the bullet manually inserted into the cartridge case neck and thence the cartridge with the bullet thereon manually moved upwardly into the lower end portion 38c of the bore of die 36. While the portion of the cartridge case extending downwardly below die 36 is manually held with one hand, the other hand may be utilized to move the handle to pivot it in the direction of the arrow 33. Movement of the carrier to an elevation that the jaws are above the pointed portion of the ovening stud 63 results in the jaws being translated toward one another to a position that they abut against the pointed portion of the minimum space adjustment stud 59 which prevents the jaws from being moved into abutting relationship.

To be mentioned is that prior to this time, the stud 59 has been threaded upwardly relative the carrier a sufficient amount that the minimum transverse spacing of the jaws is such that when the jaws are moved upwardly to initially abut against the rim flange of the cartridge being held in die 36, the cartridge rim will initially engage bevelled portion 45e of the dies rather than the generally planar top surface portions of the jaws. Thus, if the minimum spacing of the jaws is not sufficiently great, the cartridge rim would initially engage the generally planar top surfaces of the jaws. On the other hand, if the spacing is too great, then the rim portion would freely pass vertically relative the jaws without engaging bevelled portion 45e, and the jaws would thereby be precluded by adjustment 59 from clampingly abutting against the rim flange and the lips 45c would not be moveable to a position overlying the rim flange.

With the stud 59 properly adjusted, and the carrier moved to a sufficiently high elevation, the bottom surface of rim flange will initially abut against incline recessed portions 45e. Slightly further upward movement of the carrier will result in the rim flange sliding over the bevelled surfaces 45e to spread the jaws sufficiently that the rim flange will pass between opposed lips 45c. Thence when the rim flange is relatively at a lower elevation than lips 46c, springs 56 resiliently urge the jaws back to a position that the lips 45c will be in overlying relationship to the rim flange to clampingly hold the cartridge case on the carrier. Further upward movement of the carrier results in the rim abutting against the carrier and thence the cartridge case and bullet forced upwardly in the die 36 to properly seat the bullet.

Now the handle is pivoted in a direction opposite arrow 33. Since the jaws now clampingly engage the rim flange, movement of the carrier in a downward direction pulls the cartridge case together with the seated bullet out of the die 36. The carrier can be moved to a datum condition where the jaws spread apart to a cartridge release position due to the opening stud 63 spreading the jaws sufficiently that no portion of lips 45c are in overhanging relationship to the rim flange.

It is believed obvious from the description in the preceding two paragraphs that if the adjustment stud 59 is properly set and the carrier is located sufficiently above opening stud 63, that merely exerting a downward force on the cartridge case so that rim portions will initially abut against bevelled surfaces 45e, the jaws will be spread against the action of springs 56 and thence snap back into position that the lips overly the rim flange to clampingly hold the cartridge case on the carrier. Further, as indicated, since there is provided a separate coil spring for each jaw, the jaws will automatically vertically center the cartridge case as it is moved to a vertical position that it is clampingly held on the carrier.

In the event the cartridge holder jig is to be utilized for holding thick rim cartridges, then the screws 54 may be removed, the jig removed from the holder and thence the jaws 48, 49 turned end for end such that recesses 51 would be located at the position of recesses 50 as shown in FIGURE 5. Now the jaw holder 46 and jaws are re-mounted on the carrier and are ready to be used with thick rim cartridge.

As many widely and apparently different embodiments of the invention may be made without departing from the spirit and scope thereof, it is to be understood I do not limit myself to the specific embodiments thereof.

What I claim is:

1. For performing a work operation on a cartridge case through the use of a suitable die, a loading press comprising a frame having a base portion, a head and a frame portion for connecting the base portion to the head and mounting the head at least in part in overhanging relationship to said base portion and substantially vertically spaced therefrom, a pair of elongated, transversely spaced, vertical guide rods slidably extended through said base portion and said head, a carrier mounted on an intermediate portion of said guide rods for movement therewith and located vertically between said head and said base portion, a handle having a bifurcated leg portion extending on either transverse side of said head, first means for pivotally connecting said legs to said head to pivot about a horizontally axis, a pair of links each having a first end portion and a second end portion, second pivot means for pivotally connecting the first end portions of the links to opposite transverse sides of said carrier to pivot about a second horizontal pivot axis, third pivot means for pivotally connecting the second end portions to said legs to through pivotal movement of said handle move said links and thereby the carrier between a first position adjacent said base portion and a second position adjacent said head, and means mounted on the carrier for holding a cartridge case to extend vertically thereabove, said head having means for mounting the die vertically aligned with a cartridge case held by the cartridge case holding means whereby as the carrier is moved to its second position, a work operation is performed on the cartridge case by the die.

2. For performing a work operation on a cartridge case through the use of a suitable die, a loading press comprising a frame having a base portion and a head at least in part in overhanging relationship to said base portion, a cartridge carrier, vertical guide rod means mounted by and slidably extended through said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said handle having bifurcated legs, each leg having a triangular part that includes a first apex portion and a leg portion extending outwardly from said first apex portion, each of said triangular parts having a second apex portion pivotally connected to the frame and a third apex portion pivotally connected to said linkage means, said head having means for mounting said die in overhanging relationship to said carrier, and means mounted on the carrier for removably holding a cartridge case on the carrier in position to have the die perform a work operation on the cartridge case as the carrier is moved between said positions.

3. For performing a work operation on a cartridge case through the use of a suitable die having a main body portion and an annular mounting member of a larger diameter than the corresponding dimension of said main body portion mounted on said main body portion, a loading press comprising a frame having a base portion and a head at least in part in overhanging relationship to said base portion, a cartridge carrier, vertical guide rod means mounted by and slidably extended through said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, said head means including a slotted portion that in horizontal cross sections have a generally U-shaped slot of a size to slidably receive said mounting member, and an upper lip and a lower lip in part respectively overlaying and underlaying said mounting member when the head means mounts the die, means on the head for releasably retaining the mounting member in said slot, and means mounted on the carrier for removably holding a cartridge case on the carrier in position to have the die perform a work operation on the cartridge case as the carrier is moved between said positions.

4. For performing a work operation on a cartridge case having a cartridge socket through the use of a suitable die, a loading press comprising a frame having a base portion and a head at least in part in overhanging relationship to said base portion, a cartridge carrier, vertical guide rod means mounted by and slidably extended through said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, means mounted on the carrier for removably holding a cartridge case on the carrier in position to have the die perform a work operation on the cartridge case as the carrier is moved between said positions, said guide means including a pair of horizontally spaced guide rods having upper end portions extending to a higher elevation than said head, primer loader means mounted on said upper end portions for releasably holding a cartridge case in position to receive a primer, and means mounted on the head beneath said primer loader means for releasably holding a primer and seating said primer in the cartridge socket as said handle is pivoted to move said carrier from said datum position.

5. For performing a work operation on a cartridge case through the use of a suitable die, a loading press comprising a frame having a base portion and a head at least in part in overhanging relationship to said base portion, a cartridge carrier, vertical guide rod means mounted by and slidably extended through said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, means mounted on the carrier for removably holding a cartridge case on the carrier in position to have the die perform a work operation on the cartridge case as the carrier is moved between said positions, said cartridge holder means including a pair of cartridge gripping jaws and means mounted on the carrier mounting said jaws for movement between a spread apart cartridge releasing position and a cartridge gripping position, and means mounted on the frame for automatically moving said jaws to said cartridge releasing position as the carrier is moved toward its datum position.

6. For performing a work operation on a cartridge case having a rim flange through the use of a suitable die, a loading press comprising a frame having a base portion and a head at least in part in overhanging relationship to said base portion, a cartridge carrier, vertical guide rod means mounted by and slidably extended through said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, and means mounted on the carrier for removably holding a cartridge case on the carrier in position to have the die perform a work operation on the cartridge case as the carrier is moved between said positions, said cartridge holder means including a pair of jaws of symmetrical construction, each jaw having opposite end portions, each of said opposite end portions having a rim flange recessed portion, means mounting said jaws on the carrier for limited reciprocal movement between a rim flange releasing position and a rim flange gripping position, and separate resilient means for each jaw on the jaw mounting means for resiliently urging the respective jaw toward the other and to the rim flange gripping position.

7. The apparatus of claim 6 further characterized in that said jaw holding means comprises a rectangular holder plate having a central longitudinal groove opening to opposite longitudinal edges of said plate and a transverse groove on either transverse side of said longitudinal groove that opens thereto and to the respective transverse side of said plate, and that each jaw has an intermediate rectangular portion in one of the transverse grooves and a longitudinally projecting ear at each corner of said intermediate portion that projects outwardly of said groove, said ears limiting the slideable movement of the intermediate portion relative said holder plate.

8. For performing a work operation on a cartridge case through the use of a suitable die, a loading press comprising a frame having a base portion and a head at least in part in overhanging relationship to said base portion and substantially vertically spaced therefrom, a pair of elongated, transversely spaced, vertical guide rods slidably extended through said base portion and said head, a carrier mounted on an intermediate portion of said guide rods for movement therewith and located vertically between said head and said base portion, a handle having a bifurcated leg portion extending on either transverse side of said head, first means for pivotally connecting said legs to said head to pivot about a first horizontally axis, a pair of links each having a first end portion and a second end portion, second pivot means for pivotally connecting the first end portions of the links to opposite transverse sides of said carrier to pivot about a second horizontal pivot axis, third pivot means for pivotally connecting the second end portions to said legs in radial spaced relationship to the first horizontal axis to through pivotal movement of said handle move said links and thereby the carrier between a first position adjacent said base portion and a second position adjacent said head, the length of the links between said second horizontal axis and the pivotal connection of the third pivot means being substantially greater than the radial spacing between said first horizontal axis and the pivotal connection of the third pivot means whereby the third pivot means is located at an elevation intermediate the first and second pivot means when the carrier is in its first position, and means mounted on the carrier for holding a cartridge case to extend vertically thereabove, said head having means for mounting the die vertically aligned with a cartridge case held by the cartridge case holding means whereby as the carrier is moved to its second position, a work operation is performed on the cartridge case by the die.

9. For performing a work operation on a cartridge case through the use of a suitable die, a loading press comprising a frame having a base portion and a head at least in part in overhanging relationship to said base portion and substantially vertically spaced therefrom, a pair of elongated, transversely spaced, vertical guide rods slidably extended through said base portion and said head, a carrier mounted on an intermediate portion of said guide rods for movement therewith and located vertically between said head and said base portion, a handle having a bifurcated leg portion extending on either transverse side of said head, first means for pivotally connecting said legs to said head to pivot about a horizontally axis, a pair of links each having a first end portion and a second end portion, second pivot means for pivotally connecting the first end portions of the links to opposite transverse sides of said carrier to pivot about a second horizontal pivot axis, third pivot means for pivotally connecting the second end portions to said legs to through pivotal movement of said handle move said links and thereby the carrier between a first position adjacent said base portion and a second position adjacent said head, means mounted on the carrier for holding a cartridge case to extend vertically thereabove, said cartridge case holder means including a pair of cartridge case holder jaws and means mounting said jaws on the carrier for limited slidable movement between a cartridge case gripping position and a cartridge case release position and means on the base portion for automatically moving said jaws to their release position as the carrier is moved from its second position toward its first position, said head having means for mounting the die vertically aligned with a cartridge case held by the cartridge case holding means whereby as the carrier is moved to its second position, a work operation is performed on the cartridge case by the die.

10. The loading press of claim 9 further characterized in that said carrier has a vertical aperture therethrough opening beneath said jaws and that the jaw moving means comprises a stud secured to said base portion in vertical alignment with said aperture, said stud having an upwardly pointed conical portion and being of a length to extend above the base and through said aperture to a higher elevation than the bottom surface of said jaws when the carrier is in the first position.

11. The loading press of claim 9 further characterized in that the cartridge case has a primer socket and that the loading press includes means for seating a primer in said socket, the last mentioned means including means mounted on the upper ends of the guide rods for movement therewith to hold the last mentioned cartridge case in a vertical upright condition and having a vertical opening therethrough that opens to the primer socket, and means on the head vertical aligned with the last mentioned aperture for holding a primer and seating said primer in the cartridge case socket as the handle is pivoted to move the carrier from its second position toward its first position.

12. In a cartridge case loading press for performing a work operation on a cartridge case having a cartridge socket, a frame having a base portion and a head at least inpart in overhanging relationship to said base portion and substantially spaced therefrom, a pair of guide rods vertically slideably mounted by said base portion and said head, said guide rods being of substantially longer lengths than the maximum vertical distance between surfaces of said base portions and head and extending to a higher elevation then said head, a carrier mounted on said guide rods intermediate said head and base portion for movement therewith, a handle pivotally connected to said head, means connecting the handle to the carrier for moving the carrier between a position adjacent the head and a position adjacent the base portion as the handle is pivoted, means on the guide rods above said head for holding the cartridge case with the socket facing said head, the last mentioned means being mounted on said guide rods for movement therewith and having a vertical opening therethrough opening to the cartridge case socket, and means mounted on said head vertically beneath said vertical opening for holding and seating a primer in said socket as the handle is pivoted to move the carrier toward its position adjacent the base.

13. For a cartridge case loading press having a carrier, a jig comprising a pair of general flat, transversely elongated cartridge case gripping jaws, each jaw having a cartridge case holding recessed end portion, a transversely intermediate rectangular portion and an ear joined to each corner of said intermediate rectangular portion to project longitudinally outwardly thereof, a rectangular jaw holder mountable on said carrier in at least partial overlying relationship to said jaws to mount said jaws for limited transverse movement with the recessed portions facing one another between a spread apart condition and a cartridge case gripping position, said holder having a depending land at each corner to project downwardly transversely between a pair of transversely spaced ears of the respective jaws, said lands limiting the transverse movement of the jaws relative one another and relative the holder, and a central vertical opening between the recessed portions of the jaws to have a cartridge case extended therethrough, and resilient means mounted by the holder for resiliently urging the jaws to a cartridge case gripping position.

14. For performing a work operation on a cartridge case having a rim flange through the use of a suitable die, a loading press comprising a frame having a base portion and a head at least in part in overhanging relationship to said base portion, a cartridge carrier, vertical guide rod means mounted by said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, means mounted on the carrier for removably holding a cartridge case on the carrier in position to have the die perform a work operation on the cartridge case as the carrier is moved between said positions, said cartridge holder means includes a pair of rim flange gripping jaws and means mounting said jaws on the carrier for movement between a spread apart cartridge releasing position and a cartridge gripping position, and means mounted on the carrier and extending upwardly between said jaws for adjustably maintaining at least the minimum spacing between the jaws, the jaw mounting means including means for resiliently urging said jaws toward one another.

15. For performing a work operation on a cartridge case through the use of a suitable die, a loading press comprising a frame having a base portion and a head at least in part in overhanging relationship to said base portion, a cartridge carrier, vertical guide rod means mounted by said head and base portion and mounting said carrier intermediate said head and base portion for reciprocal movement, a handle pivotally mounted on the frame, linkage means interconnecting the handle and carrier for reciprocating the carrier between a datum position adjacent the base portion and a pressing position adjacent said head as the handle is pivoted, said head having means for mounting said die in overhanging relationship to said carrier, means mounted on the carrier for removably holding a cartridge case on the carrier in position to have the die perform a work operation on the cartridge case as the carrier is moved between said positions, said cartridge case holder means having a vertical opening for receiving the lower end portion of the cartridge case so that the cartridge case abuts against said carrier, said carrier having a vertical aperture of a smaller cross sectional area than the cartridge case that at its upper end opens to a cartridge case held by said holder means, a primer discharge tube having an upper end portion secured to said carrier to move therewith for receiving a primer falling into said vertical aperture, and a lower end portion, and a primer receiving container mounted on the discharge tube to move therewith for receiving primers falling into said tube.

16. The loading press of claim 15, further characterized in said discharge tube includes an intermediate portion slidably extended through said base portion and joining said upper and lower end portions.

17. For a cartridge case loading press having a carrier, a jig comprising a pair of general flat, transversely elongated cartridge case gripping jaws, each jaw having a cartridge case holding recessed end portion and an opposite end portion, a rectangular portion transversely intermediate said end portions and joined thereto, each end portion having longitudinal opposite ears projecting longitudinally outwardly beyond said rectangular portion, and a rectangular jaw holder mountable on said carrier in at least partial overlying relationship to said jaws to mount said jaws for limited transverse movement with said recessed portions facing one another between a position the jaws are abuttable against one another and a spaced apart position, said holder including a bottom surface portion having longitudinal cutout and a transverse cutout on either side of the longitudinal cutout to open thereto, said cutouts providing four lands, each land projecting downwardly between a pair of transversely spaced ears of the respective jaw, the transverse dimension of the longitudinal cutout being substantially greater than twice the corresponding dimension of each of the ears of said recessed end portion and the longitudinal dimension of each transverse cutout being slightly greater than the corresponding dimension of each rectangular portion when the holder mounts said jaws for limited movement, said holder having a central vertical opening opening therethrough to said longitudinal cutout and between the recessed portions of the jaws to have a cartridge case extended therethrough, and resilient means mounted by the holder for resiliently urging the jaws to a cartridge case gripping position.

18. The apparatus of claim 17 further characterized in that each jaw recessed end portion has a cartridge holding recess longitudinally between the last mentioned end portion lands, said recess having a rim flange engaging lip, said lip being beveled downwardly in a direction away from the respective jaw.

References Cited
UNITED STATES PATENTS

| | | | |
|---|---|---|---|
| 2,660,085 | 11/1953 | Swansick | 86—36 |
| 3,105,409 | 10/1963 | Schlappich | 86—38 |
| 3,107,575 | 10/1963 | Paul | 86—44 |

BENJAMIN A. BORCHELT, *Primary Examiner.*

P. A. SHANLEY, *Assistant Examiner.*